(12) United States Patent
Grassl et al.

(10) Patent No.: US 8,708,926 B2
(45) Date of Patent: Apr. 29, 2014

(54) DOUBLE TEMPERATURE SENSOR

(75) Inventors: Thomas Grassl, Lübeck (DE); Marco Ventur, Lübeck (DE); Jochim Koch, Ratzeburg (DE); Frank Sattler, Lübeck (DE)

(73) Assignee: Drägerwerk AG & Co. KGaA, Lübeck (DE)

( * ) Notice: Subject to any disclaimer, the term of this patent is extended or adjusted under 35 U.S.C. 154(b) by 365 days.

(21) Appl. No.: 12/751,108

(22) Filed: Mar. 31, 2010

(65) Prior Publication Data

US 2010/0292605 A1 Nov. 18, 2010

(30) Foreign Application Priority Data

May 14, 2009 (EP) .................................. 09160255

(51) Int. Cl.
*A61B 5/01* (2006.01)
*G01K 13/00* (2006.01)

(52) U.S. Cl.
USPC ............................. 600/549; 347/100; 347/208

(58) Field of Classification Search
USPC ................... 600/549; 374/100–104, 106, 107, 374/110–115, 137, 150, 151, 208
See application file for complete search history.

(56) References Cited

U.S. PATENT DOCUMENTS

| | | | | | |
|---|---|---|---|---|---|
| 3,811,958 | A | * | 5/1974 | Maurer | 136/233 |
| 3,828,766 | A | * | 8/1974 | Krasnow | 600/391 |
| 4,595,020 | A | * | 6/1986 | Palti | 600/549 |
| 4,914,173 | A | * | 4/1990 | Ansell | 528/49 |
| 5,582,508 | A | * | 12/1996 | Chou | 417/32 |
| 6,641,402 | B2 | | 11/2003 | Boggs | |
| 6,886,978 | B2 | * | 5/2005 | Tokita et al. | 374/169 |
| 6,929,611 | B2 | | 8/2005 | Koch | |
| 7,682,312 | B2 | * | 3/2010 | Lurie | 600/481 |
| 7,938,783 | B2 | * | 5/2011 | Fraden | 600/549 |
| 2001/0051821 | A1 | * | 12/2001 | Snyder | 607/142 |
| 2003/0032893 | A1 | * | 2/2003 | Koch | 600/549 |
| 2003/0069714 | A1 | | 4/2003 | Wigley et al. | |
| 2005/0027206 | A1 | * | 2/2005 | Ariav | 600/529 |
| 2005/0276309 | A1 | | 12/2005 | Koch | |
| 2008/0039739 | A1 | * | 2/2008 | Buja | 600/549 |
| 2008/0170600 | A1 | * | 7/2008 | Sattler et al. | 600/549 |
| 2008/0214949 | A1 | | 9/2008 | Stivoric et al. | |
| 2010/0121217 | A1 | * | 5/2010 | Padiy et al. | 600/549 |

FOREIGN PATENT DOCUMENTS

| | | |
|---|---|---|
| DE | 100 38 247 A1 | 5/2001 |
| DE | 101 39 705 A1 | 4/2003 |
| DE | 10 2007 002 369 B3 | 5/2008 |
| EP | 0 399 061 A1 | 11/1990 |
| EP | WO 2008/078271 | 7/2008 |

* cited by examiner

*Primary Examiner* — Max Hindenburg
*Assistant Examiner* — John Pani
(74) *Attorney, Agent, or Firm* — McGlew and Tuttle, P.C.

(57) ABSTRACT

A double temperature sensor is provided for determining the body temperature. The sensor includes at least a first temperature sensor element for measuring a near-surface temperature of the ambient air and a second temperature sensor element for measuring a temperature of the skin surface. The first and the second temperature sensor elements are arranged in a sensor block. A holding element surrounds the sensor block at least partially. An adhesive element fixes the holding element on the skin surface. A spring element acts on the sensor block and provides a spring force directed in the direction of the skin surface.

12 Claims, 3 Drawing Sheets

DOUBLE TEMPERATURE SENSOR

CROSS REFERENCE TO RELATED APPLICATIONS

This application claims the benefit of priority under 35 U.S.C. §119 of European Patent Application EP 09 160 255.7 filed May 14, 2009, the entire contents of which are incorporated herein by reference.

FIELD OF THE INVENTION

The present invention pertains to a double temperature sensor for determining the body temperature. Double temperature sensors are used in the known manner to measure a near-surface temperature of the ambient air and the skin surface.

BACKGROUND OF THE INVENTION

A double temperature sensor with two temperature sensors arranged in a heat flux insulation block designed in one piece as a housing with respective electric connections belonging to them has become known from DE 10 2007 002 369. The temperature sensor elements are arranged in the heat flux insulation block essentially in parallel to one another and at spaced locations from the outer surface of the heat flux insulation block, the distance being formed by a layer of the insulating material.

Double temperature sensors are used, for example, in respirator products in connection with the detection and monitoring of the body temperature in order to make it possible to infer the general physiological condition of the user of the respirator product. A head band, as it is described, for example, in DE 101 39 705 A1, may be used for this application to attach the double temperature sensors. A band element is in contact with the scalp of a head band user and is used to receive a temperature sensor measuring the skin temperature.

Furthermore, double temperature sensors are used in medical technology, especially for measuring the body temperature of newborn babies. It is desirable here as well to make it possible to arrange the double temperature sensors on the newborn babies in a simple manner.

Furthermore, it was found in practice that it is desirable for the double temperature sensors to be designed for single-time use. Single-time use of the sensors is in the foreground especially in the area of medical technology based on the prevention of the transmission of germs.

SUMMARY OF THE INVENTION

Consequently, the object of the present invention is to make available an inexpensive double temperature sensor that can be used a single time and can be arranged on the surface of a person's body in a simple manner.

The device according to the present invention comprises at least one first temperature sensor element for measuring a near-surface temperature of the ambient air, a second temperature sensor element for measuring a temperature of the skin surface, wherein the first and second temperature sensor elements are arranged in a sensor block; a holding element surrounding the sensor block at least partly; an adhesive element for fixing the holding element on the skin surface, and a spring element, which acts on the sensor block and whose spring force is directed in the direction of the skin surface.

An essential advantage of the present invention is an optimal adaptation of the double temperature sensor to curvatures of the skin surface based on the design according to the present invention, as a result of which better handling and especially more accurate measured signal transmission will arise in practice. In particular, the sensor block can be better adapted to the skin with the spring element acting on the sensor block. A minimum pressure with which the sensor block is pressed onto the skin is advantageously obtained hereby for better thermal contact with the skin and hence for more accurate detection of the temperature. The spring element may be arranged between the holding element and the sensor block. As an alternative to this, the spring element may also be integrated in the holding element. The spring element is advantageously designed as an elastic material, for example, one made of a foamed material. The elastic material is intended to press the sensor block onto the skin Studies have revealed that the sensor can be individually adapted as a result to the curved skin surface of a person, for example, to the forehead. The surface may be flat, convex or concave. The spring element preferably has a spring force of about two Newton.

A heat-insulating element, which coaxially surrounds the holding element, is provided in an especially preferred embodiment of the present invention. The heat-insulating element is preferably of a cylindrical design and consists of a foamed material. The heat-insulating element advantageously protects the sensor block from lateral heat losses.

The double temperature sensor according to the present invention may be provided with at least two connection cables for connecting the temperature sensor elements to an analyzing unit, wherein a first connection cable is preferably arranged between a layer of foamed material and a gel layer of the adhesive element and a second connection cable is arranged on the layer of foamed material. Both connection cables thus extend parallel to the surface of the object. The connection cable can thus reach a temperature nearly corresponding to the skin temperature. Heat losses due to the connection cable can thus be minimized. The at least two connection cables may be arranged in the heat-insulating element in a spiral, circular, meandering, zigzag, star-shaped or polygonal pattern.

A pushbutton, which is preferably integrated into the sensor block, is integrated in an area of the sensor directed towards the skin surface in an especially advantageous embodiment of the double temperature sensor. When the double temperature sensor according to the present invention is used to measure the skin temperature of a person and the ambient air temperature, the double temperature sensor can be switched on and off by contact with the skin The present invention will be explained in more detail with reference to the drawings attached, where identical reference numbers designate identical features. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
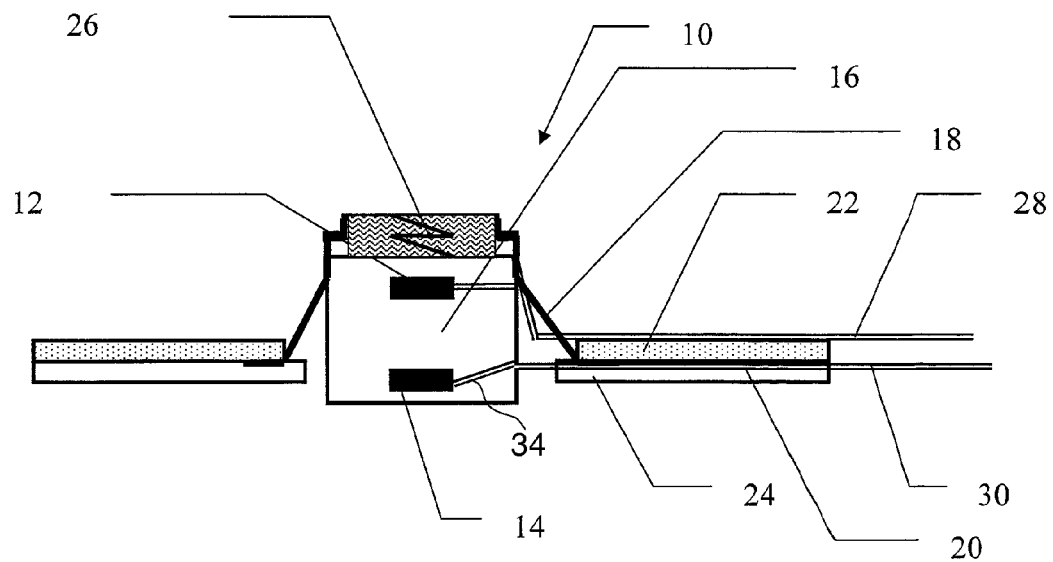
FIG. 1 is a schematic view of a first embodiment of the double temperature sensor according to the present invention with a spring element arranged between the holding element and the sensor block.

Referring to the drawings in particular, FIG. 1 shows an exemplary embodiment of a double temperature sensor according to the present invention, for example, for use for determining the body temperature of a newborn baby. The double temperature sensor 10 has a sensor block 16 designed as a housing. A first temperature sensor element 12 and a second temperature sensor element 14 are located in the sensor block 16. Sensor block 16 is fixed with a holding element 18, wherein holding element 18 surrounds the sensor block 16 on the side facing away from the skin surface. A spring element 26 is arranged between the holding element 18 and the sensor block 16. Spring element 26 consists of an elastic material, preferably a foamed material. As an alternative to the elastic material, a mechanical spring may be provided as well. In one embodiment, not shown, the holding element 18 may have snap-in elements, which make snapping in and hence fixation of the sensor block 16 within the holding element 18 possible.

Furthermore, an adhesive element 20 is provided, which makes it possible to arrange the holding element 18 with the spring element 26 and with the sensor block 16 on the skin surface. The is built of a layer of foamed material 22 and a gel layer 24. The gel layer 24 is used to connect the adhesive element 20 to the skin surface. The spring element 26 is advantageously designed such that a pressing force of at least two Newton of the sensor block 16 on the skin surface is reached. Good contact with the skin and stable thermal connection between the sensor block 16 and the skin surface are thus guaranteed. Spring element 26 acts on the sensor block 16, and the spring force of the spring element 26 is directed in the direction of the skin surface. The sensor block 16, holding element 18 and adhesive element 20 are arranged coaxially with one another. The temperature sensor elements 12 and 14 are directed at right angles to the central axis within the sensor block 16. Thus, both the first temperature sensor element 12 and the second temperature sensor element 14 are in parallel to the skin surface. As an alternative to this, the first temperature sensor element 12 and the second temperature sensor element 14 may be arranged laterally offset in the sensor block 16.

Adhesive element 20 is advantageously provided with a gel layer 24, which makes possible an optimal connection with a rough skin surface. A holding element 18 with a gel layer 24 can be used a number of times for a first positioning and a possible prepositioning. Double temperature sensors with holding elements 18 comprising a gel layer 24 are skin-friendly and do not leave behind any traces of skin on the gel layer on detachment of the holding elements, as a result of which the risk of skin irritation can be avoided or reduced. As an alternative to this, holding element 18 may also be designed with an adhesive layer.

At least two connection cables 28 and 30 are provided to connect the two temperature sensor elements 12 and 14. The connection cables 28 and 30 are used to connect the double temperature sensor to an analyzing unit. A first connection cable 28 is advantageously provided here between the layer of foamed material 22 and the gel layer 24. A second connection cable 30 is arranged on the layer of foamed material 22.

Figure 2:
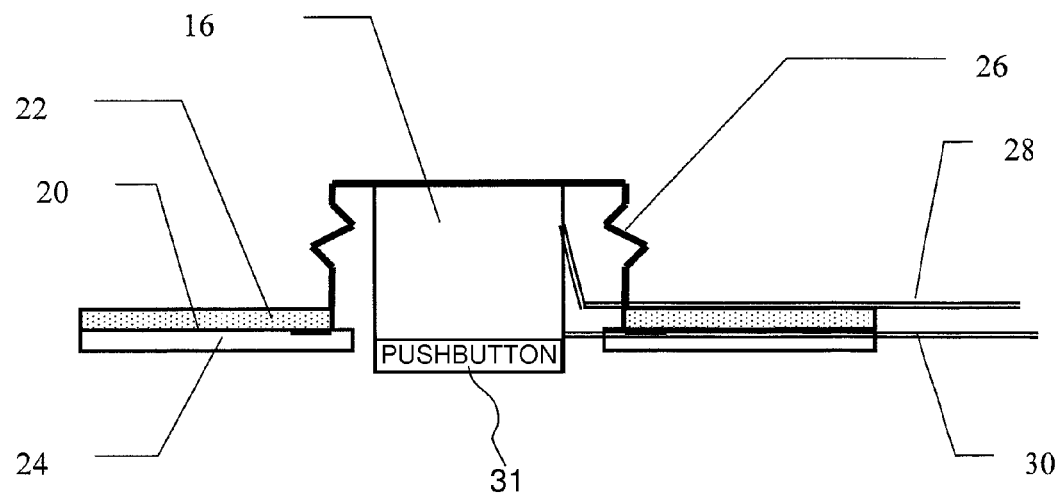
FIG. 2 is a schematic view of a second embodiment of the double temperature sensor according to the present invention with spring elements integrated in the holding element.

In another embodiment of the double temperature sensor 10 according to the present invention, shown in FIG. 2, spring element 26 is integrated in holding element 18. Two spring elements 26 are provided in the holding element 18 in this embodiment. As an alternative hereto, a plurality of or only one, for example, ring-shaped spring element 26 may also be provided in the holding element.

Figure 3:
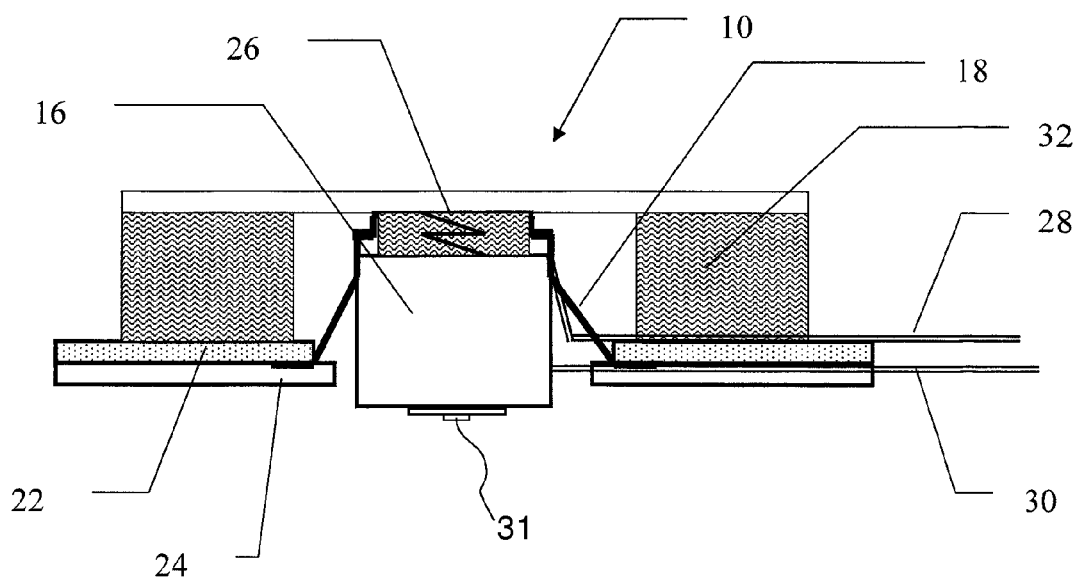
FIG. 3 is a schematic view of the double temperature sensor according to the present invention in the embodiment with a heat-insulating element.

A heat-insulating element 32, which coaxially surrounds the holding element 18, is additionally provided in the embodiment variant shown in FIG. 3. This embodiment is especially suitable for determining the core temperature on adults for better insulation from other thermal effects. The insulating material of the heat-insulating element 32 is preferably made of a foamed material. The heat-insulating element 32 is held on the top side by an element preferably consisting of an aluminum-coated film with a high degree of reflection in the infrared radiation range, hereinafter called reflector pad. The reflector pad can be connected to the heat-insulating element 32 by means of a bonding process. In addition, the connection between the reflector pad and the holding element 18 may be brought about by means of a bonding process. The heat-insulating element 32 is made of an elastic material, so that tolerances due to curvatures of the skin surface can be advantageously compensated in a flexible manner for stable fixing of the double temperature sensor. The double temperature sensor according to the present invention can thus be well adapted to the contour of the skin surface.

The first connection cable 28 and the second connection cable 30 can be arranged analogously to the embodiment variant shown and described in FIG. 1. Furthermore, an additional heat insulation of the first and second connection cables 28 and 30 against the skin surface may be provided. The first and second connection cables 28 and 30 may have an additional insulation in the area of sensor block 16, and the diameter of the first and second connection cables 28 and 30 is made advantageously larger in the area of sensor block 16, such schematically shown in FIG. 1. The cable may be routed in this enlarged area, for example, in a helical or meandering pattern in order to thus increase the length of cable lying on the skin surface. A temperature difference between the sensor block 16 and the first and second connection cables 28 and 30 can thus be reduced.

In another embodiment variant, not shown, the first and second connection cables 28 and 30 may be arranged in a spiral, circular, meandering, zigzag, star-shaped or polygonal pattern in the heat-insulating element 32.

Figure 4:
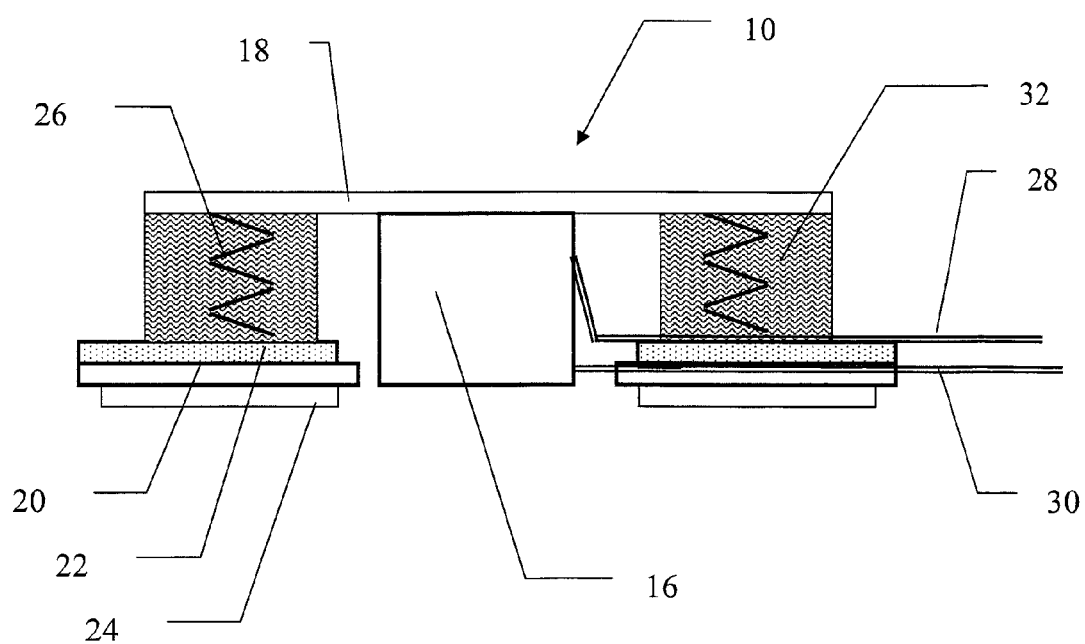
FIG. 4 is a schematic view of the double temperature sensor according to the present invention in an embodiment of a heat-insulating element with spring action.
Figure 5:
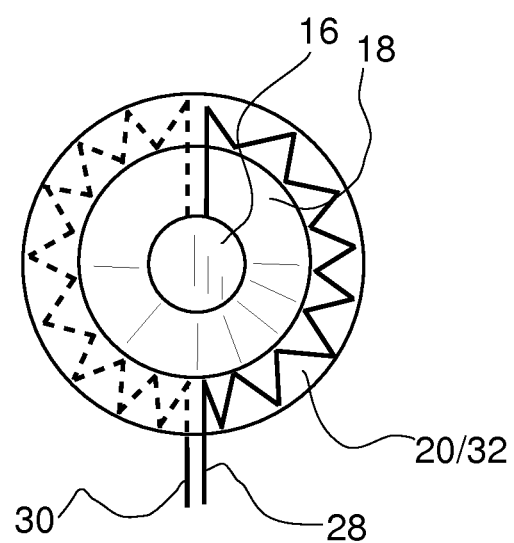
FIG. 5 is an axial schematic view of the double temperature sensor according to the present invention.

In another embodiment variant shown in FIG. 4, holding element 18 forms one unit with the heat-insulating element 32, which unit is integrated and fixed in the sensor block 16. Spring element 26 is integrated in the heat-insulating element 32. The first and second connection cables 28 and 30 are arranged analogously to the embodiments shown in FIGS. 1 through 3.

In general, the first and second temperature sensor elements 12 and 14 may be designed in sensor block 16 as digital components each, which is provided with an electronic analyzing unit and a power supply unit and make, furthermore, wireless data transmission of the measured temperature values to an analyzing unit possible.

The double temperature sensor 10 can be switched off and on by means of a pushbutton 31, which is preferably integrated in sensor block 16, and is schematically shown in FIG. 2.

A memory element (not shown), in which, for example, the characteristic of the first temperature sensor element 12 and of the second temperature sensor element 14 can be stored, may be preferably provided in the sensor block 16 of the double temperature sensor 10 in another embodiment.

The double temperature sensor according to the present invention is of a cylindrical shape in the embodiment variants described and shown in FIGS. 1 through 4. As an alternative hereto, the surface of the double temperature sensor according to the present invention may also be made arched.

While the present invention was described with reference to the preferred exemplary embodiments, various changes and modifications are clear to the person skilled in the art. All these changes and modifications shall fall within the scope of protection of the claims presented. While specific embodiments of the invention have been described in detail to illustrate the application of the principles of the invention, it will be understood that the invention may be embodied otherwise without departing from such principles.

What is claimed is:

1. A double temperature sensor for determining body temperature, the double temperature sensor comprising:
    a first temperature sensor element for measuring a near-surface temperature of ambient air;
    a second temperature sensor element for measuring a temperature of a skin surface, said first temperature sensor element and said second temperature sensor element being arranged in a sensor block;
    a holding element at least partially surrounding said sensor block;
    an adhesive element connected on one side to said holding element, said adhesive element being adapted for fixing said holding element on the skin surface with another side of said adhesive element, said adhesive element being made with a layer of foamed material and a gel layer;
    a spring element, which acts on said sensor block and whose spring force directs said sensor block towards the skin surface when said adhesive element fixes said holding element to the skin surface,
    at least two connection cables for connecting the temperature sensor elements to an analyzing unit, wherein a first connection cable is arranged between said layer of foamed material and said gel layer and a second connection cable is arranged on said layer of foamed material.

2. The double temperature sensor in accordance with claim 1, wherein said spring element is arranged between said holding element and said sensor block.

3. The double temperature sensor in accordance with claim 1, wherein said spring element is integrated in said holding element.

4. The double temperature sensor in accordance with claim 1, wherein said spring element comprises at least one of an elastic material, foamed material and a mechanical spring.

5. The double temperature sensor in accordance with claim 1, wherein said sensor block, said holding element and said adhesive element are arranged coaxially with one another, wherein the temperature sensor elements are arranged along a central axis of said sensor block.

6. The double temperature sensor in accordance with claim 1, wherein at least one air inclusion is provided between said holding element and said sensor block.

7. The double temperature sensor in accordance with claim 1, further comprising a heat-insulating element comprising a foamed material coaxially surrounding said holding element.

8. The double temperature sensor in accordance with claim 7, wherein said heat-insulating element is of a cylindrical design.

9. The double temperature sensor in accordance with claim 1, wherein a pushbutton is provided in an area of the sensor block directed towards the skin surface.

10. A temperature sensor for an object with a surface, the temperature sensor comprising:
    a sensor block;
    a first temperature sensor element arranged in said sensor block and measuring a temperature at an ambient air surface of said sensor block;
    a second temperature sensor element arranged in said sensor block and adapted for measuring a temperature of the surface of the object;
    a holding element connected to said sensor block and at least partially surrounding said sensor block;
    an adhesive element connected to said holding element on one side, said adhesive element having another side adapted to connect to the surface of the object, said adhesive element being made with a layer of foamed material and a gel layer;
    a spring element acting on said sensor block and adapted to press the sensor block toward the surface; and
    first and second connection cables connected to said first and second temperature sensor elements, and extending away from said first and second temperature sensor elements to a surrounding area, said first and second connection cables extending through said adhesive element in parallel to the surface of the object, said first connection cable being arranged between said layer of foamed material and said gel layer and said second connection cable being arranged on a side of said layer of foamed material diametrically opposite said first connection cable.

11. The temperature sensor in accordance with claim 10, wherein said sensor block, said holding element and said adhesive element are arranged coaxially with one another, wherein said first temperature sensor element and said second temperature sensor element are arranged along a central axis of said sensor block.

12. The temperature sensor in accordance with claim 10, further comprising a heat-insulating element comprising a foamed material at least partially surrounding the holding element.

* * * * *